March 1, 1966 H. W. KEITHLEY, JR 3,237,584
STEERING AID ASSEMBLY
Filed Nov. 21, 1963 7 Sheets-Sheet 1

INVENTOR
Howard W. Keithley, Jr.
BY
Mason, Fenwick & Lawrence
ATTORNEYS

March 1, 1966 H. W. KEITHLEY, JR 3,237,584
STEERING AID ASSEMBLY
Filed Nov. 21, 1963 7 Sheets-Sheet 2

INVENTOR
Howard W. Keithley, Jr.
BY
Mason, Fenwick & Lawrence
ATTORNEYS

March 1, 1966 H. W. KEITHLEY, JR 3,237,584
STEERING AID ASSEMBLY
Filed Nov. 21, 1963 7 Sheets-Sheet 3

INVENTOR
Howard W. Keithley, Jr.

BY
Mason, Fenwick & Lawrence
ATTORNEYS

March 1, 1966   H. W. KEITHLEY, JR   3,237,584
STEERING AID ASSEMBLY
Filed Nov. 21, 1963   7 Sheets-Sheet 4

INVENTOR
Howard W. Keithley, Jr.
BY
Mason, Fenwick & Lawrence
ATTORNEYS

March 1, 1966 H. W. KEITHLEY, JR 3,237,584
STEERING AID ASSEMBLY

Filed Nov. 21, 1963 7 Sheets-Sheet 5

INVENTOR
Howard W. Keithley, Jr.

BY
Mason, Fenwick & Lawrence
ATTORNEYS

INVENTOR
*Howard W. Keithley, Jr.*

BY *Mason, Fenwick & Lawrence*
ATTORNEYS

United States Patent Office 3,237,584
Patented Mar. 1, 1966

3,237,584
STEERING AID ASSEMBLY
Howard W. Keithley, Jr., 9221 Willow Lane,
Adelphi, Md.
Filed Nov. 21, 1963, Ser. No. 325,245
14 Claims. (Cl. 114—144)

The present invention relates generally to an improved steering assembly for any vehicle. More specifically, the present invention relates to an improved steering aid which by its use will make the sterring of a desired compass heading much easier for the helmsman of a ship, or any vehicle.

One of the principal objects of the present invention is the provision of a device to aid in maintaining a steady preselected course for any vehicle.

Another object of the present invention is to provide a compass which will emit an audible signal to the helmsman to instantaneously warn him of an error in the desired compass heading.

Another object of the present invention is to provide an improved navigation and piloting aid which will indicate by a visual signal an incorrect compass heading.

Another object is to provide an improved compass, the use of which will allow even a novice or semi-skilled helmsman to steer a desired compass heading with greater accuracy.

A still further object is to provide an improved compass which will allow the helmsman to select an amount of tolerable error inherent in the manual steerage of a vessel.

A still further object is to provide an improved compass which can be utilized for the automatic, as well as manual, steerage of a vessel.

Finally, one of the objects of the present invention is to provide an improved compass which can be easily manufactured, which is compact, and which is very easily serviced for maintenance and repair.

Other objects and advantages of the invention will become apparent from the following description when read in conjunction with the drawings which accompany and form part of this specification, and in which.

Referring now in greater detail to the drawings, the steering or piloting aid assembly as a whole is indicated by the reference numeral 20 and consists of a case 22, which receives the necessary switch, batteries and associated structure, and the binnacle unit 23, all of which is to be described. The case 22 may be of any convenient shape and size, the form shown being by way of example only; however, it is preferred that the case 22, and for that matter any other necessary structure, be of a non-magnetic material, such as plastic, wherever possible. In the illustrated embodiment the case 22 has side walls 24, rear panel 26, inclined front panel 28, and bottom 30. The top cover 32 comprises forward lid 34, provided with lifting tab 36, hinged to fixed rear lid 38, which may have the binnacle unit 23 bolted thereon. Conveniently mounted on the inclined front panel 28 is the selector switch 44 and visual indicator signs 46, 48. To enhance the visibility of the indicator signs 46, 48, and to reduce glare, the shields 50, 52 are positioned to overhang each of the indicator signs.

The binnacle unit 23 is here shown mounted upon rear lid 38 and is borne in the usual gimbal 54, which is secured as shown by bolts 56 through rear lid 38. The gimbal 54, and with it the binnacle unit, is therefore removable for a purpose to be stated later herein.

Figure 8:
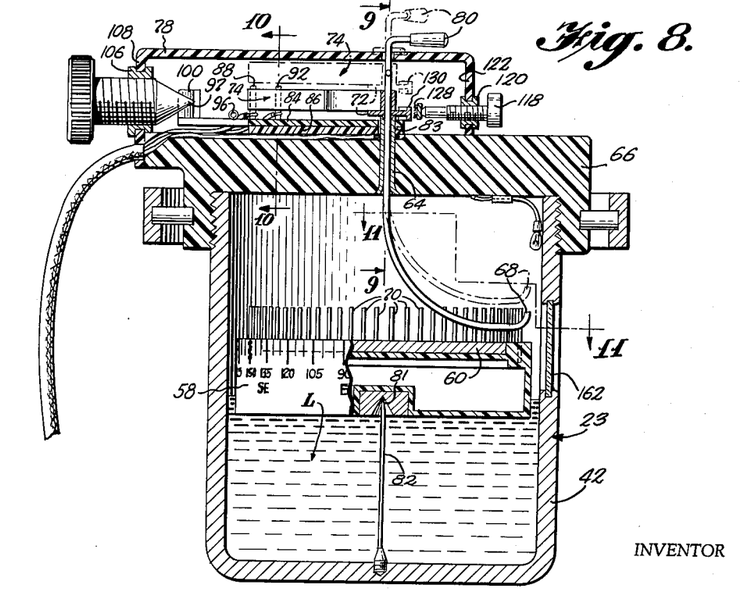
FIGURE 8 is a vertical longitudinal sectional view of the binnacle unit and is taken along the line 8—8 of FIGURE 7.
Figure 10:
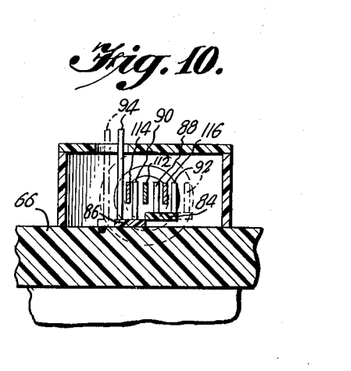
FIGURE 10 is a fragmentary sectional view in a vertical plane taken along the line 10—10 of FIGURE 8.
Figure 11:
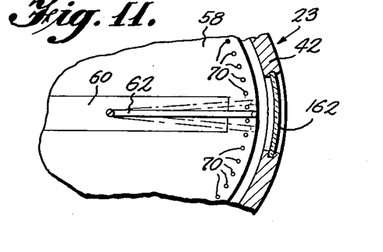
FIGURE 11 is a fragmentary plan view of the compass card and is taken along the line 11—11 of FIGURE 8.
Figure 12:
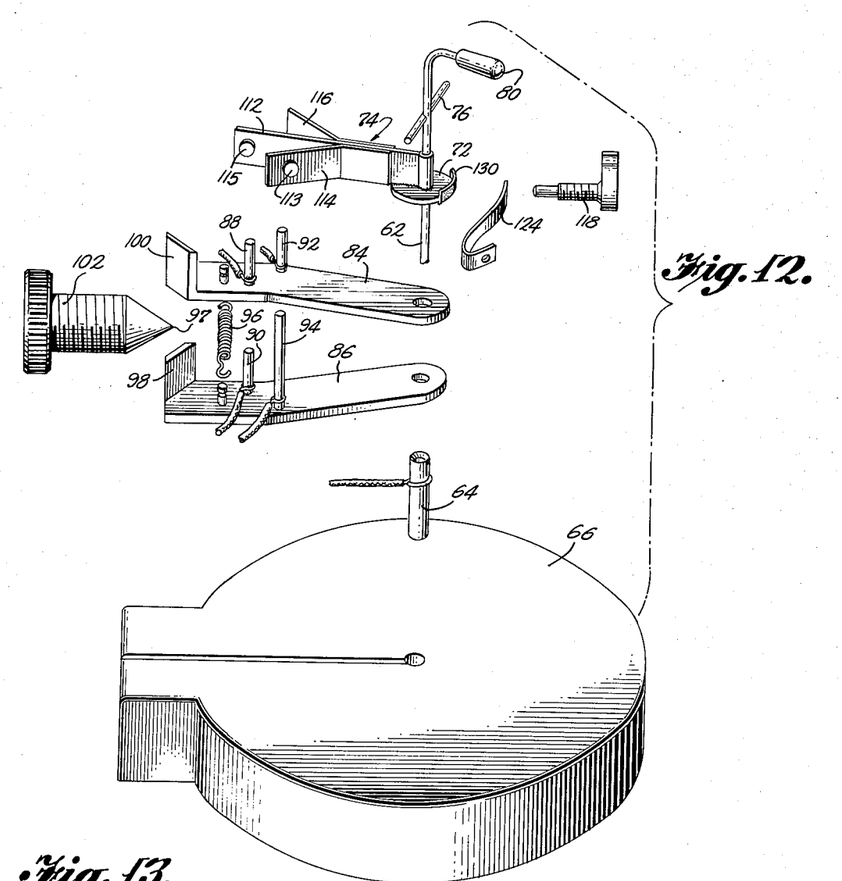
FIGURE 12 is an enlarged exploded perspective view of the details of the piloting aid assembly.
Figure 13:
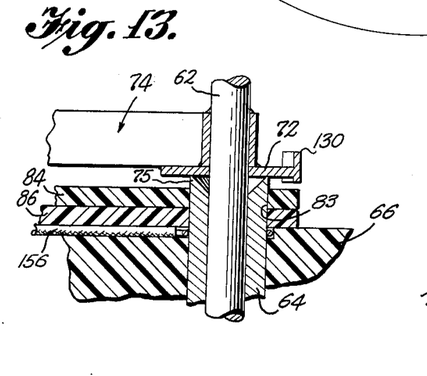
FIGURE 13 is an enlarged fragmentary vertical sectional view taken along the line 13—13 of FIGURE 9.

As best shown in FIGURE 8, the binnacle unit 23 consists of a bowl 42, which contains the compass card 58, formed on the floatable, rotatable, indicating compass body 59, which in turn carries or supports in any conventional manner a magnet 60. A cap 66 closes the top of the bowl 42 and forms a part of the binnacle for supporting the compass heading or direction selector lever 62, which is loosely journaled in a bushing 64, positioned at the center of the cap. A selector lever 62 extends downwardly through cap 66 and then curves forwardly where it terminates in a slight hook 68. It will also be seen that the compass card body 59 is provided with upstanding flexible rods 70 at spaced direction or heading intervals around its peripheral edge between which the terminal hooked end 68 of the compass heading selector lever may be received.

At its upper end, the selector lever 62 has secured thereto for vertical and pivotal movement with the lever 62 a conductor disc 72 (shown in FIGURES 7, 8, and 9) and multiple elongated switch elements 74. As shown, the bushing 64 is suitably supplied with electrical current, which is passed on to the movable switch elements by the conductor disc 72 when it bears against a chamfered or flared top edge 75 of the bushing 64. Above the switch elements just described, the selector lever 62 has affixed to its upper end a small cross-arm 76 extending transversely to the longitudinal axis of the selector lever 62. This cross-arm normally lies beneath a switch cover plate 78. A slot 79 is provided in the cover plate 78 through which the cross-arm 76 and the selector lever 62 may pass when the cross-arm is aligned with the slot and lifted vertically by means of the knob 80. Such lifting disengages the selector lever from between rods 70 and allows the compass to be used in a conventional manner. To maintain this disengagement, the knob 80 and therefore selector lever 62 are first lifted to raise arm 76 above slot 79 and then rotated in either direction within bushing 64. When released, the cross-arm 76 is supported on the top surface of the cover plate 78 to effectively hold the compass heading selector lever 62 out of engagement with the flexible rods 70.

The compass card 58, having the usual indicia, may be of conventional construction, such as the hollow body 59 as shown, or a solid body of lighter specific gravity than the liquid L to enable it to float on the liquid in the binnacle. The compass card 58 and body 59 are shown as being pivoted at a pivot apex 81 upon a central vertical pivot shaft 82, secured to the base of compass bowl 42, which therefore supports the compass card 58 and the body 59. It is obvious, of course, that the pivot shaft could be secured to the body 59 or even to the cap 66. As shown, the card 58 is principally supported by the liquid L, while the pivot shaft 82 acts primarily as a means to center the card in the bowl.

Pivotally connected at 83 to the stationary bushing 64 are a pair of adjustable contact support arms 84, 86. Affixed to each of the arms is a pair of conventional contact posts 88, 90, 92 and 94, forming a sensing means to detect movement of the switch element 74. When certain of these switch elements are closed, either a visual or audible signal will be given to the helmsman, or a motor circuit will be actuated to automatically steer the vessel. The arms 84 and 86 are pivotally adjustable in a plane parallel to the cap 66, being biased toward each other by means of the spring 96 and caused to diverge by the forward action of the tapered cam point 97 against the diverging vertical flanges 98, 100, located at the ends of the arms 84 and 86. For movement control of the point 97, a thumb screw 102 extends integrally from the point and may be threaded into bushing 106, fixed into the rear wall 108 of the cover plate 78. As should be manifest, the turning of the screw 102 moves the tapered point 97 into contact with the diverging vertical flanges 98, 100, thereby forcing the arms 84 and 86 apart, resulting in the spreading of the contact posts 88, 90, 92, and 94.

Figure 7:
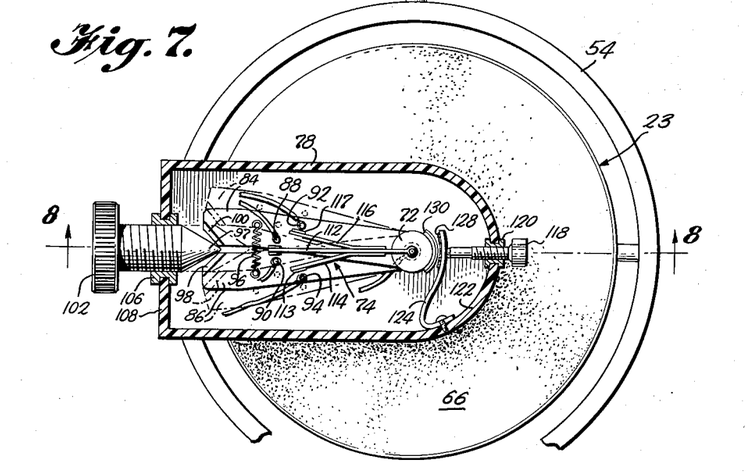
FIGURE 7 is a horizontal sectional view taken along line 7—7 of FIGURE 2, showing the structure by which the tolerable steering error may be varied.

In order to accurately judge the magnitude of spacing that exists between the contact posts 88 and 90 and posts 92 and 94, at least one post, such as post 94, is made to extend upwardly through an arcuate slot 108 in the cover plate 78. The arcuate slot 108 is provided with an adjacent degree scale 110, and as contact post 94 moves along slot 108 as a result of the camming action of the point 97, the angular measurement can be read instantaneously.

It should be clear that in the present embodiment, the adjustable arms 84 and 86 preferably each carry a pair of contact posts 88 and 90, or 92 and 94, symmetrically positioned relative to the axis of the point 97, and therefore each pair of contact posts moves away from, or toward, each other the same distance relative to the axis of point 97, which for convenience coincides with the plane of the center line fore and aft of the compass cap 66.

Referring to FIGURES 7, 8, 12, and 13, it will be seen that the selector lever 62 has secured thereto a center switch arm 112 and angularly or laterally extending arms 114 and 116, which together constitute the movable switch elements. These arms are provided at their ends with conventional contact points 113, 115, and 117, respectively. Arm 112, as shown, is longer than the arms 114 and 116 and is designed to make alternate contact with posts 88 or 90, while lateral arm 114 contacts post 94 and lateral arm 116 contacts post 92.

As shown, the position of the posts 88, 90, 92, and 94 is such that switch element 116 will contact post 92 precisely at the same time that center switch arm 112 contacts post 88. Similarly, switch element 114 will contact post 94 at the same time that center switch arm 112 contacts post 90. Thus, duplicate switching will occur to make and break contact with either the audible signaling means or with the visual signaling means, as will be explained hereinafter.

As is sometimes the case on a rough, heavy sea, the compass card will tend to "hunt" or wander erratically within the compass bowl and thus induce similar movement in the lever 62. If such were to occur with the present structure, many signals, either audible or visual, would occur over a short period of time. To avoid this possibility and retard the movement of the lever 62, a friction screw 118 (FIGURES 7, 8, and 12) is threaded through an internally threaded bushing 120, fixed in the front wall 122 of cover plate 78. The friction screw 118 is so positioned as to bear against a leaf spring 124, mounted to the inside of cover 78. The leaf spring 124 is tensioned to bear continuously against the friction screw 118 on its inner face and is provided with a frictional surface 128, such as felt or sponge rubber, or the like. To frictionally engage surface 128, conductor disc 72 is provided with a vertical flange 130. It is to be understood that only a very minute amount of friction need be applied to the flange 130 to stabilize the compass heading selector lever 62, as too such pressure would tend to immobilize the lever. The amount of pressure to be applied, therefore, is dependent upon the roughness of the sea, wind velocity, and the tide.

Figures 1, 2:
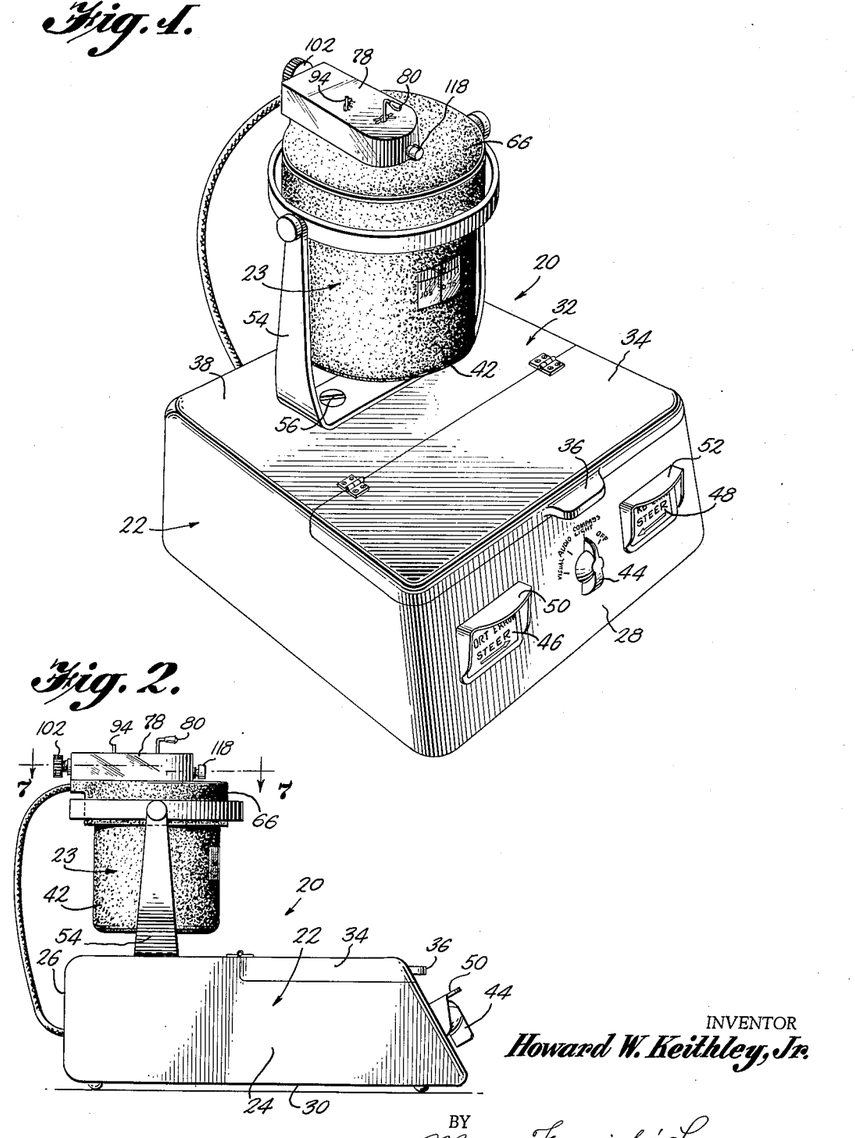
FIGURE 1 is a front perspective view of the invention.
FIGURE 2 is a side elevation.
Figure 3:
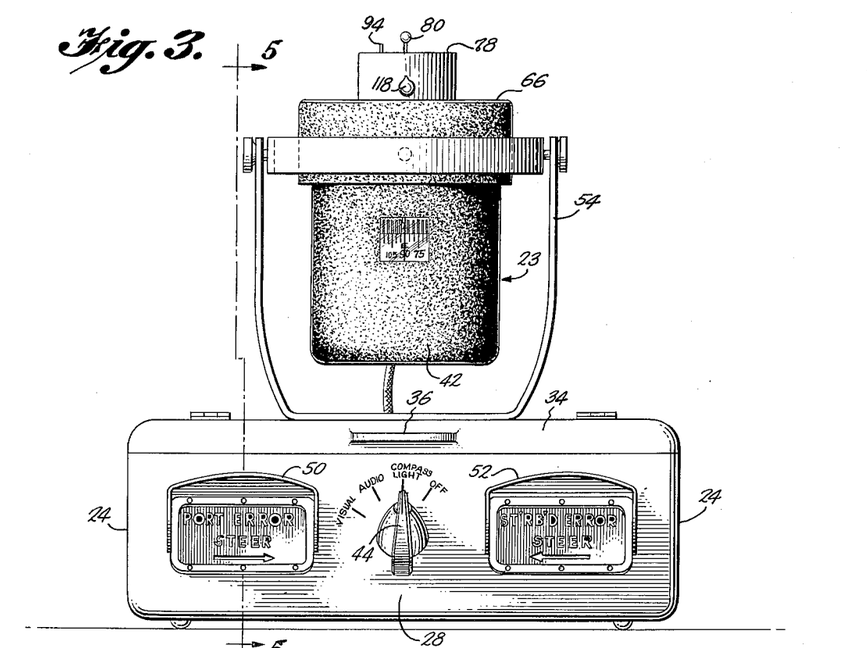
FIGURE 3 is a front elevation view.
Figure 4:
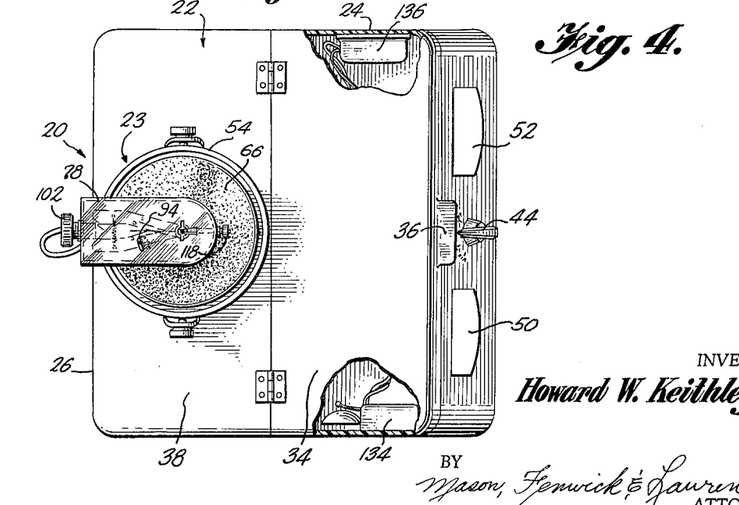
FIGURE 4 is a top plan view with the cover broken away to expose the audible signaling mechanism.
Figures 5, 9:
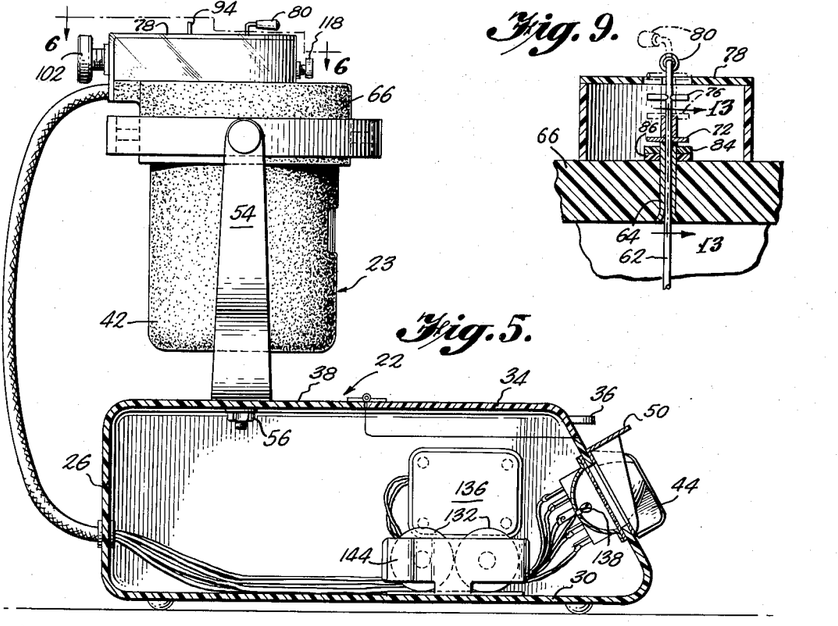
FIGURE 5 is a vertical longitudinal-sectional view taken along line 5—5 of FIGURE 3.
FIGURE 9 is a fragmentary vertical-sectional view showing the means for disengaging the compass heading selector, and is taken along the line 9—9 of FIGURE 8.
Figure 6:
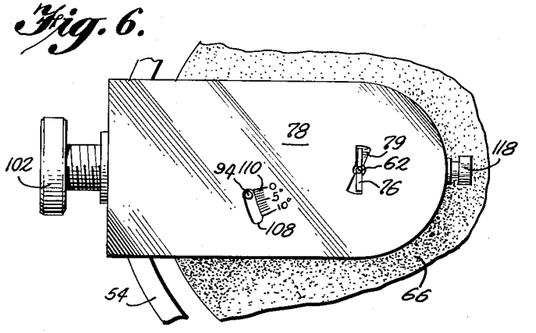
FIGURE 6 is a fragmentary plan view taken along line 6—6 of FIGURE 5.
Figure 16:
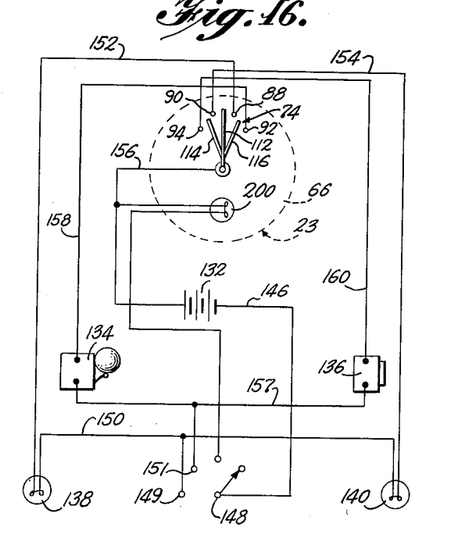
FIGURE 16 is a schematic wiring diagram of the invention as utilized for the manual steerage of a vehicle.

Referring now particularly to FIGURES 3, 4, and 5 and the wiring diagram of FIGURE 16, it will be seen that case 22 contains two batteries 132, or other suitable electrical power source, and a conventional bell 134 and buzzer 136. Indicator sign 46, which warns of an error to the port of the desired compass heading, preferably is provided with a red lens, while indicator sign 48, which warns of an error to the starboard of the desired compass heading, is preferably provided with a green lens, each of the said indicator signs being further provided with lamp bulbs 138, 140, mounted in suitable reflectors 142.

The batteries 132, mounted in a suitable battery holder 144 in parallel relationship, have one terminal connected by conductor 146 to the center post 148 of selector switch 44. With the selector switch 44 turned to the "visual" mode of operation by contacting post 149, current is supplied through the common conductor 150 to lamps 138 and 140, and then to contact post 88 through the conductor 152 and to contact post 90 through the conductor 154. Should an error to starboard occur, contact posts 88, 90 will be shifted to the starboard with the vessel relative to the lever 62, and contact switch elements 74, moving post 90 against switch element 112, thus completing a circuit through conductor 156 to the ground side of the batteries to light lamp 140. The lamp will remain bright as long as the contact post 90 and switch element 112 are closed.

In the event an error to port should occur, contact post 88 will then shift to port with the vessel and will close with switch element 112, completing a circuit through conductor 152, switch element 112 and conductor 156 to ground, thereby causing lamp 138 to light as long as the switch element 112 and contact post 88 are closed.

With the selector switch 44 set to the "audio" mode of operation by contacting post 151, current is supplied to a common conductor 157 and bell 134 and buzzer 136. From the bell 134 a conductor wire 158 is connected to contact post 92, while from the buzzer 136 a conductor 160 is connected to contact post 94. Should an error to starboard occur, contact posts 88, 90, 92, and 94 will be shifted to starboard with the vessel closing switch element 114 and contact post 94. A circuit through the buzzer is now completed, causing a continuous signal as long as the switch element 114 and contact post 94 are closed. By steering to port the helmsman will thereby open the circuit and cause the signal to stop.

In the event an error to port should occur, contact post 92 will close against switch element 116, completing a circuit through bell 134. By steering to starboard the helmsman will open the circuit when the desired heading is reached, thereby causing the bell to stop ringing. It should be clear that by utilizing the "audio" mode, the helmsman is no longer required to scan the compass card and can keep his vessel on her course simply by responding to the audible signal of the bell or buzzer. Under adverse conditions, such as a dense fog or other poor visibility where the helmsman may be subjected to vertigo, the "audio" mode of operation is particularly effective.

It should be understood that since the compass needle or magnet constantly seeks magnetic north, the vessel actually turns about the compass card. The upstanding flexible rods 70, spaced at intervals about the peripheral edge of compass card 58, simply restrain the compass heading selector lever 62 in the same direction as the desired heading of the vessel. Since contact posts 88, 90, 92, and 94 move with the vessel, deviation from the desired heading will cause them to contact switch elements 74, as explained above. By turning thumb screw 102, the helmsman can vary the amount of angular distance between the adjustable arms 84 and 86, which in turn determines the amount of tolerable error, and therefore the sensitivity in the steering aid assembly.

The flexibility of the rods 70 allows a more resilient contact to be made against selector lever 62; however, it is not absolutely necessary that the rods 70 be flexible.

Figure 14:
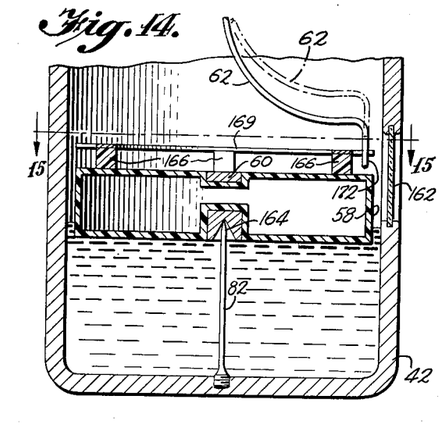
FIGURE 14 is a fragmentary vertical sectional view of a modified form of the present invention.
Figure 15:
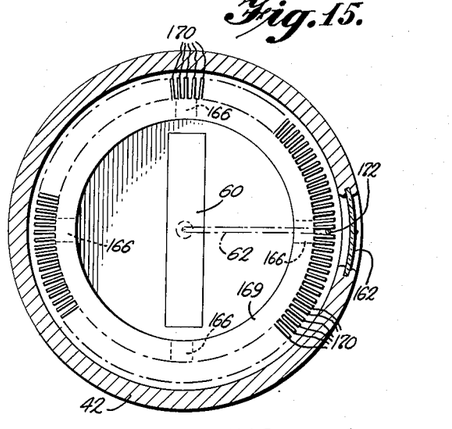
FIGURE 15 is a horizontal sectional view taken along the line 15—15 of FIGURE 14.

A modified form of the compass card and selector lever is illustrated in FIGURES 14 and 15. In this form, compass bowl 42, provided with the usual sight window 162 has the compass card 58 floatably supported upon pivot shaft 82 in bearing or pivot apex 164, as previously described. Supported upon spacer blocks 166 upon the upper surface of the compass card 58 is a thin ring 169 having integral radial teeth 170 extending therefrom. The compass heading selector lever 62 is in this form provided with a downwardly extending finger 172, which can be selectively engaged between the radial teeth 170 of the ring 168. The finger 172 may be flattened to the extent that it would only be one degree thick at the edge of the compass card 58. This would allow for closer spacing of the radial teeth 170 about the circumference of the ring 168. The operation of this embodiment is otherwise identical to the operation previously described.

Figure 17:
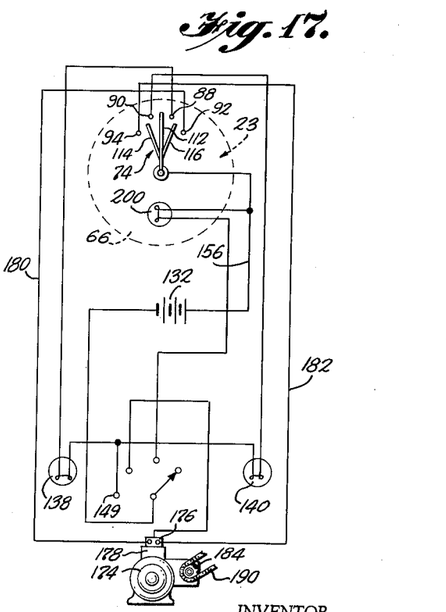
FIGURE 17 is a schematic wiring diagram of the invention as utilized as an automatic pilot.
Figure 18:
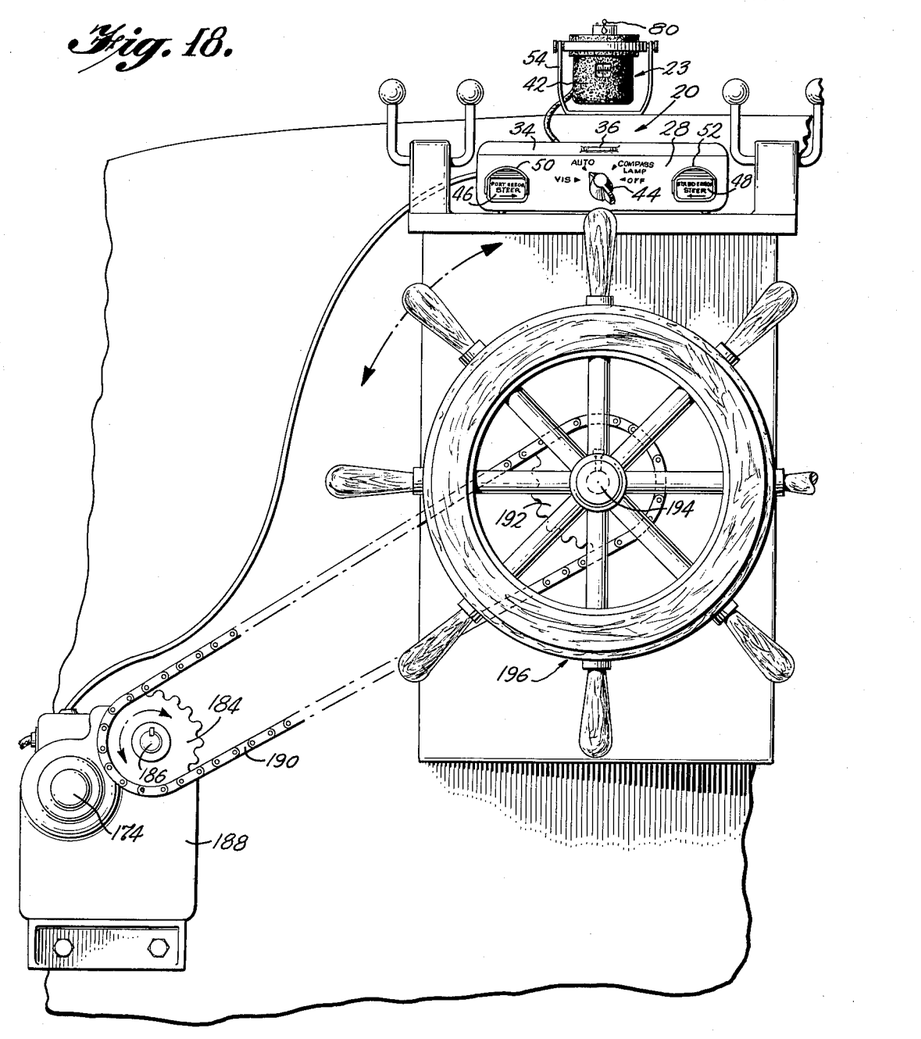
FIGURE 18 is an elevational view of a ship's binnacle and helm showing the present invention installed as an automatic pilot.

Referring to FIGURES 17 and 18, the device is shown utilized as an automatic pilot. For simplicity the audible signaling means previously described have been omitted, and in its place a steering motor 174, relay 176, and reversing switch 178 have been substituted.

A conductor 180 connects one side of the relay with contact post 92, while conductor 182 connects the opposite side of the relay with contact post 94; otherwise, the wiring diagram is the same as described in conjunction with FIGURE 16. When an error to starboard occurs, contact post 94 closes with switch element 114, completing a circuit to the relay 176, which closes a motor circuit, causing the motor 174 to rotate in a counter-clockwise direction. A sprocket 184, fixed to shaft 186 of gear reducer 188, drives by means of chain 190, a second sprocket 192, detachably secured to the shaft 194 of the ship's wheel 196. The motor 174 will continue to rotate in a counter-clockwise direction until the correction in the ship's heading causes contact post 94 to separate from switch element 114. Should the vessel continue on its heading to port, switch element 116 will be contacted by the contact post 92, completing a circuit to the opposite side of the relay 176, which energizes the motor circuit to cause motor 174 to rotate in a clockwise direction until switch element 116 and contact post 92 have opened. The sprocket 192 may be secured in a detachable manner to the shaft 194 of the ship's wheel in any well-known manner, such as by a set screw or a collet, for example, so that the automatic pilot may be readily detached in order to steer manually. The automatic pilot most often is used on large bodies of water when steering a straight course for protracted periods; however, when nearing obstacles, such as buoys or other vessels, and when docking the vessel, it is most convenient to have the automatic pilot quickly and easily detachable.

When using the device as an aid to the manual steerage of a vessel, the binnacle unit 23 can be detached by removing bolts 56 and relocating in a more suitable position, if it is desired. For instance, the binnacle unit could be mounted over or near the ship's helm, while the case 22 containing the signaling media could be located in the captain's cabin to allow him to check on the accuracy of the helmsman. It is also possible to have two or more cases 22 located at different places in the ship by attaching them in parallel wiring.

After establishing a location for the binnacle unit 23 and it is desired to operate the device, the knob 80 is turned to allow the cross-arm 76 to pass through slot 79 after establishing the desired compass heading. With the vessel holding precisely on its heading, the hooked end 68 of compass heading selector lever 62 is lowered between the two flexible rods 70 located behind and on each side of the lubber line 198. The hooked end 68 may be painted a bright fluorescent color to allow it to be easily seen, thereby aiding in the placement of it between the flexible rods 70.

The selector switch 44 is next turned to the desired mode of operation and the device carefully observed over a short period of time to note the frequency of signals. The thumb screw 102 is next manipulated to bring the contact post 94 opposite the acceptable degree of tolerable course error on degree scale 110. The helmsman can check the device for accuracy by turning the vessel away from her heading by the amount indicated on degree scale 110, first to one side and then to the other, and noting if a proper signal is given. Should the sea be rough and choppy, or if the vessel is quartering across the waves, the helmsman may turn friction screw 118 in a clockwise direction to apply a small amount of frictional pressure on flange 130 of conductor disc 72.

If a novice helmsman is allowed to steer the vessel in the absence of a qualified helmsman, he need only be told to acknowledge the signals flashed on the front panel 28, or if the selector switch 44 is in the "audio" position, to steer to starboard if a bell should ring, or to steer to port if a buzzer should sound.

When it is desired to change to a different compass heading, it is only necessary to lift knob 80, bring the vessel to her new heading and then lower the selector lever 62 with its end 68 positioned between the new pair of flexible rods 70 which coincide with the new compass heading.

Quite obviously, the device can be used as a conventional compass by lifting knob 80 until cross-arm 76 passes through slot 79 and rotating the knob 80 so that the compass heading selector lever is held out of engagement with the flexible rods 70. The compass can now be used in the conventional manner without the signaling means operating.

While not illustrated in the drawings, it is contemplated that the binnacle unit 23 may be provided with the usual compensator magnets, in order to calibrate the compass accurately. When the binnacle unit 40 is installed, the necessary precautions about mounting the unit near any large masses of magnetic metal, electrical wiring, or electronic equipment should be observed; otherwise the compass may not function properly.

To facilitate the setting of a new compass heading at night, the lamp 200 is placed within the cap 66, so as to illuminate the painted end 68 of compass heading selector lever 62 and also the flexible rods 70 which lie behind the lubber line 198.

It is obvious that the present invention may be used for directing or guiding any moving object; therefore, the term "craft" as used herein is intended to broadly include all vessels, vehicles, or aircraft or any other objects on land, sea or air.

From the foregoing detailed description it will be evident that there are a number of changes, adaptations and modifications of the present invention which come within the province of those skilled in the art. However, it is intended that all such variations not departing from the spirit of the invention be considered as within the scope thereof as limited solely by the appended claims.

I claim:

1. A steering aid assembly for a vehicle comprising a compass having a rotatable heading indicating body, support means for said body to permit rotation relative to the vehicle in accordance with changes in heading of the vehicle, heading selector means movably supported within said assembly and operable by preselected rotational movement of said body to move said selector means, said heading selector means being movable into and out of contact with said body to permit predetermined free movement of said body, movement sensing means secured to said assembly to detect predetermined movements of said selector means when moved by said body due to heading changes of said vehicle, and signal means connected to said sensing means to signal preselected magnitudes of said changes in heading.

2. A steering aid assembly for a vehicle comprising a compass having a rotatable heading indicating body, support means for said body to permit rotation relative to the vehicle in accordance with changes in heading of the vehicle, heading selector means movably supported within said assembly and operable by preselected rotational movement of said body to move said selector means, said heading selector means being movable into and out of contact with said body to permit predetermined free movement of said body, heading interval means positioned on said body for receiving and controlling movement of selector means, movement sensing means secured to said assembly to detect predetermined movements of said selector means when moved by said body due to heading changes of said vehicle, and signal means connected to said sensing means to signal preselected magnitudes of said changes in heading.

3. A steering aid assembly for a vehicle comprising a compass having a rotatable heading indicating body, support means for said body to permit rotation relative to the vehicle in accordance with changes in heading of the vehicle, heading selector means movably supported within said assembly and operable by preselected rotational movement of said body to move said selector means, said selector means being journaled for upward movement out of engagement with said body to permit predetermined free movement of said body, movement sensing means secured to said assembly to detect predetermined movements of said selector means when moved by said body due to heading changes of said vehicle, means positioned on said assembly for controlling the sensitivity of said sensing means, and signal means connected to said sensing means to signal preselected magnitudes of said changes in heading.

4. A steering aid assembly for a vehicle comprising a compass having a rotatable heading indicating body, support means for said body to permit rotation relative to the vehicle in accordance with changes in heading of the vehicle, heading selector means movably supported within said assembly and operable by preselected rotational movement of said body to move said selector means, heading interval means positioned on said body for receiving and controlling movement of selector means, said interval means comprising a plurality of upstanding rods spaced at predetermined intervals, movement sensing means secured to said assembly to detect predetermined movements of said selector means when moved by said body due to heading changes of said vehicle, and signal means connected to said sensing means to signal preselected magnitudes of said changes in heading.

5. A steering aid assembly for a vehicle comprising a compass having a rotatable heading indicating body, support means for said body to permit rotation relative to the vehicle in accordance with changes in heading of the vehicles, heading selector means movably supported within said assembly and operable by preselected rotational movement of said body to move said selector means, said heading selector means being movable into and out of contact with said body to permit predetermined free movement of said body, switch element means secured to said selector means for movement therewith, movement sensing means secured to said assembly to detect predetermined movements of said selector means when moved by said body due to heading changes of said vehicle, and signal means connected to said sensing means to signal preselected magnitudes of said changes in heading.

6. A steering aid assembly for a vehicle comprising a compass having a rotatable heading indicating body, support means for said body to permit rotation relative to the vehicle in accordance with changes in heading of the vehicle, heading selector means movably supported within said assembly and operable by preselected rotational movement of said body to move said selector means, said selector means being journaled for upward movement out of engagement with said body to permit predetermined free movement of said body, movement sensing means secured to said assembly to detect predetermined movements of said selector means when moved by said body due to heading changes of said vehicle, and motor means operatively connected to said sensing means to steer said vehicle along a preselected course.

7. A steering aid assembly for a vehicle comprising a compass having a rotatable heading indicating body, support means for said body to permit rotation relative to the vehicle in accordance with changes in heading of the vehicle, heading selector means movably supported within said assembly and operable by preselected rotational movement of said body to move said selector means, said selector means being journaled for upward movement out of engagement with said body to permit predetermined free movement of said body, heading interval means positioned on said body for receiving and controlling movement of selector means, movement sensing means secured to said assembly to detect predetermined movements of said selector means when moved by said body due to heading changes of said vehicle, and motor means operatively connected to said sensing means to steer said vehicle along a preselected course.

8. A steering aid assembly for a vehicle comprising a campass having a rotatable heading indicating body, support means for said body to permit rotation relative to the vehicle in accordance with changes in heading of the vehicle, heading selector means movably supported within said assembly and operable by preselected rotational movement of said body to move said selector means, said selector means being journaled for upward movement out of engagement with said body to permit predetermined free movement of said body, movement sensing means secured to said assembly to detect predetermined movements of said selector means when moved by said body due to heading changes of said vehicle, means positioned on said assembly for controlling the sensitivity of said sensing means, and motor means operatively connected to said sensing means to steer said vehicle along a preselected course.

9. A steering aid assembly for a vehicle comprising a compass having a rotatable heading indicating body, support means for said body to permit rotation relative to the vehicle in accordance with changes in heading of the vehicle, heading selector means movably supported within said assembly and operable by preselected rotational movement of said body to move said selector means, said interval means comprising a plurality of upstanding rods spaced at predetermined intervals, movement sensing means secured to said assembly to detect predetermined movements of said selector means when moved by said body due to heading changes of said vehicle, and motor means operatively connected to said sensing means to steer said vehicle along a preselected course.

10. A steering aid assembly for a vehicle comprising a compass having a rotatable heading indicating body, support means for said body to permit rotation relative to the vehicle in accordance with changes in heading of the vehicle, heading selector means movably supported within said assembly and operable by preselected rotational movement of said body to move said selector means, heading interval means positioned on said body for receiving and controlling movement of selector means, said interval means comprising a plurality of upstanding rods spaced at predetermined intervals, switch element means secured to said selector means for movement therewith, movement sensing means secured to said assembly to detect predetermined movements of said selector means when moved by said body due to heading changes of said vehicle, means positioned on said assembly for controlling the sensitivity of said sensing means, and signal means connected to said sensing means to signal preselected magnitudes of said changes in heading.

11. A steering aid assembly for a vehicle comprising a compass having a rotatable heading indicating body, support means for said body to permit rotation relative to the vehicle in accordance with changes in heading of the vehicle, heading selector means movably supported within said assembly and operable by preselected rotational movement of said body to move said selector means, heading interval means positioned on said body for receiving and controlling movement of selector means, said interval means comprising a plurality of upstanding rods spaced at predetermined intervals, switch element means secured to said selector means for movement therewith, movement sensing means secured to said assembly to detect predetermined movements of said selector means when moved by said body due to heading changes of said vehicle, means positioned on said assembly for controlling the sensitivity of said sensing means, and motor means operatively connected to said sensing means to steer said vehicle along a preselected course.

12. A steering aid assembly for a craft comprising a compass having a rotatable heading indicating body, support means for said body to permit rotation relative to the craft in accordance with changes in heading of the craft, heading selector means movably supported within said assembly and operable by preselected rotational movement of said body to move said selector means, heading interval means positioned on said body for receiving and controlling movement of selector means, said interval means comprising a plurality of upstanding rods spaced at predetermined intervals, switch element means secured to said selector means for movement therewith, movement sensing means secured to said assembly to detect predetermined movements of said selector means when moved by said body due to heading changes of said craft, means positioned on said assembly for controlling the sensitivity of said sensing means, said movement sensing means compriing a plurality of spaced contact posts adapted to electrically engage said switch element means, means controlling the spacing of said contact posts to thereby control when said switch element means contacts said contact posts, and signal means connected to said sensing means to signal preselected magnitudes of said changes in heading.

13. A steering aid assembly for a craft comprising a compass having a rotatable heading indicating body, support means for said body to permit rotation relative to the craft in accordance with changes in heading of the craft, heading selector means movably supported within said assembly and operable by preselected rotational movement of said body to move said selector means, heading interval means positioned on said body for receiving and controlling movement of selectors means, said interval means comprising a plurality of upstanding rods spaced at predetermined intervals, switch element means secured to said selector means for movement therewith, movement sensing means secured to said assembly to detect predetermined movements of said selector means when moved by said body due to heading changes of said craft, means positioned on said assembly for controlling the sensitivity of said sensing means, said movement sensing means comprising a plurality of spaced contact posts adapted to electrically engage said switch element means, means controlling the spacing of said contact posts to thereby control when said switch element means contacts said contact posts, and motor means operatively connected to said sensing means to steer said craft along a preselected course.

14. The assembly of claim 12 including means controlling the spacing of said contact posts to thereby control when said switch element means contacts said contact posts.

References Cited by the Examiner

UNITED STATES PATENTS

| 1,228,364 | 5/1917 | Macy | 114—144 |
| 1,406,405 | 2/1922 | McGee et al. | 114—144 |
| 1,488,372 | 3/1924 | Andrade-Lalama | 33—222 |
| 1,939,775 | 12/1933 | Holmes | 200—56 |
| 2,068,065 | 1/1937 | Neubert | 200—56 |
| 2,504,139 | 4/1950 | Malen | 114—144 X |
| 2,796,576 | 6/1957 | Braddon et al. | 318—489 |
| 2,864,990 | 12/1958 | Hill | 318—489 |

MILTON BUCHLER, *Primary Examiner.*

ANDREW H. FARRELL, *Examiner.*